(12) United States Patent
Broxton et al.

(10) Patent No.: US 9,760,631 B1
(45) Date of Patent: Sep. 12, 2017

(54) VIDEO SEGMENT PLAY-THROUGH REPORTING

(75) Inventors: Thomas J. Broxton, San Francisco, CA (US); Tim Carlo Jorges, Zurich (CH)

(73) Assignee: Google Inc., Mountain View, CA (US)

( * ) Notice: Subject to any disclaimer, the term of this patent is extended or adjusted under 35 U.S.C. 154(b) by 525 days.

(21) Appl. No.: 13/565,981

(22) Filed: Aug. 3, 2012

Related U.S. Application Data (60) Provisional application No. 61/515,524, filed on Aug. 5, 2011.

(51) Int. Cl.
*G06F 3/048* (2013.01)
*G06F 17/30* (2006.01)

(52) U.S. Cl.
CPC .. *G06F 17/30817* (2013.01); *G06F 17/30038* (2013.01)

(58) Field of Classification Search
CPC ............... H04N 21/6587; H04N 21/84; H04N 21/44012; G06Q 30/02; G06F 17/30817; G06F 17/30038; G06F 17/30852
USPC ........................................................ 715/719
See application file for complete search history.

(56) References Cited

U.S. PATENT DOCUMENTS

| | | | | |
|---|---|---|---|---|
| 7,930,391 | B1 * | 4/2011 | Holt | G06Q 30/0255 705/14.53 |
| 8,745,647 | B1 * | 6/2014 | Shin | H04N 21/442 725/10 |
| 2007/0276821 | A1 * | 11/2007 | Aravamudan et al. | 707/5 |
| 2009/0007202 | A1 * | 1/2009 | Williams et al. | 725/105 |
| 2009/0077496 | A1 * | 3/2009 | Aravamudan et al. | 715/811 |
| 2010/0005008 | A1 * | 1/2010 | Duncker | G06F 17/30893 705/26.1 |
| 2010/0125871 | A1 * | 5/2010 | Liao et al. | 725/34 |
| 2011/0066961 | A1 * | 3/2011 | Wang et al. | 715/764 |
| 2011/0078718 | A1 * | 3/2011 | Jakobi et al. | 725/35 |
| 2011/0145726 | A1 * | 6/2011 | Wei | G06F 17/30796 715/752 |

(Continued)

FOREIGN PATENT DOCUMENTS

EP         920208 B1      10/2010

OTHER PUBLICATIONS

Crowell, "Video Heatmaps, A Breakthrough for Sales Teams?", http://www.reelseo.com/video-heatmap/, Aug. 6, 2009.*

(Continued)

*Primary Examiner* — Jennifer To
*Assistant Examiner* — Joseph R Burwell
(74) *Attorney, Agent, or Firm* — Lowenstein Sandler LLP (57) ABSTRACT

Methods, systems, and apparatus for analyzing performance of video content are disclosed herein. In one aspect, performance data indicative of a number of presentations of a video at user devices is received. The performance data specifies a portion of the total duration of the video that was presented prior to presentation being terminated. For each of two or more segments of the total duration, a play-through rate is determined for the segment. The play through rate for each segment is based on a number of the presentations of the video that were not terminated prior to an end of the segment. A play-through graph generated based on the play through rates is provided. A determination is made that user interaction occurred with a particular area of the play-through graph. A portion of the video from a particular segment that corresponds to the particular area is provided.

36 Claims, 6 Drawing Sheets

(56) References Cited

U.S. PATENT DOCUMENTS

2012/0317271 A1    12/2012   Funk et al.
2012/0317272 A1    12/2012   Funk et al.
2012/0324493 A1    12/2012   Holmdahl et al.

OTHER PUBLICATIONS

Lau, "Video Analytics: What are the most valuable metrics in online video analytics?", http://www.quora.com/Video-Analytics/What-are-the-most-valuable-metrics-in-online-video-analytics, Jan. 15, 2011.*

Laubenstein, "Pros and Cons of View-Through Conversion Tracking", http://www.wordstream.com/blog/ws/2010/03/25/view-through-conversion-tracking, Mar. 25, 2010.*

Richmond, "New 'Trends' Application from Visible Measures is Invaluable—and Addictive", http://www.videonuze.com/article/new-trends-application-from-visible-measures-is-invaluable-and-addictive, Feb. 17, 2010.*

Savage, "Does length matter? It does for video!", http://wistia.com/blog/does-length-matter-it-does-for-video, Dec. 14, 2009.*

Sysomos, Inc., "A Look Inside Online Video Engagement—Part I", http://www.sysomos.com/reports/video/, Oct. 2009.*

Tassone, "New for 2011: Standardizing the Definition of View-through", http://smartdatacollective.com/wwwdomtassonecom/30224/new-2011-standardizing-definition-view-through, Nov. 29, 2010.*

Thomases, "Different Views of View-Through Tracking", http://www.clickz.com/print_article/clickz/column/1740414/views-view-tracking, Nov. 30, 2010.*

Gannes, "YouTube Offers Wisdom of Crowds as a Video-Editing Tool", https://gigaom.com/2008/09/30/youtube-offers-wisdom-of-crowds-as-a-video-editing-tool/, Sep. 30, 2008.*

Chan et al., "Your YouTube video: Hot or Not?", http://googleblog.blogspot.com/2008/09/your-youtube-video-hot-or-not.html, Sep. 30, 2008.*

Klaasen, "New YouTube Tool Helps Increase Viewing of Videos HotSpots Feature Tracks When Audience Watches", AdvertisingAge, http://adage.com/print/130816, Sep. 8, 2008.*

"Measuring image and video ad performance—AdWords Help", https://support.google.com/adwords/answer/2375431, May 2012.*

"How does Google calculate Quartile Reporting for YouTube Video Campaign?", https://www.en.adwords-community.com/t5/Tracking-Reporting/How-does-Google-calculate-Quartile-Reporting-for-Youtube-Video/td-p/20115#, May 2, 2012.*

Dorai-Raj et al., "How Surfers Watch: Measuring audience response to video advertising online", ADKDD 2010: 4th International Workshop on Data Mining and Audience Intelligence for Advertising, Jul. 25, 2010.*

"Understanding Viewer Abandonment Trends in Short-Form Online Video Content", Visible Measures Corp., Sep. 2010.*

"Guide to Google online ad formats", Google, Inc., 2008.*

* cited by examiner

VIDEO SEGMENT PLAY-THROUGH REPORTING

CROSS-REFERENCE TO RELATED APPLICATIONS

This application claims the benefit under 35 U.S.C. §119(e) of U.S. Patent Application No. 61/515,524, entitled "VIDEO SEGMENT PLAY-THROUGH REPORTING," filed Aug. 5, 2011, which is incorporated herein by reference in its entirety.

BACKGROUND

This specification relates to data processing and content item performance.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

Video advertisements are a type of advertisement that can be presented in the advertisement slots that have been defined in a web page. Video advertisements can also be presented in other types of advertisement slots, such as in advertisement slots (e.g., periods of time) in other videos. The performance of these video advertisements may be analyzed based on a number of video viewers ("viewers") that have requested presentation of the video advertisement (e.g., by initiating playback of the video advertisement). However, evaluation of the number of viewers that requested presentation of the video advertisement may not provide an advertiser with sufficient performance information.

SUMMARY

In general, one innovative aspect of the subject matter described in this specification can be embodied in methods that include the actions of receiving performance data indicative of a number of presentations of a video content item at user devices, the performance data for each presentation of the video content item also specifying a portion of the total duration of the video content item that was presented prior to presentation being terminated; determining, for each of two or more segments of the total duration, a play-through rate for the segment, the play through rate for the segment being based on a number of the presentations of the video content item that were not terminated prior to an end of the segment, each segment being a subset of the total duration; providing data that cause presentation of a report interface that includes a play-through graph, the play-through graph having two or more graph portions, each graph portion corresponding to a different segment of the video content item; determining that user interaction occurred with a particular area of the play-through graph; identifying a particular segment of the total duration that corresponds to the particular segment; and providing data that cause presentation of a portion of the video content item from the particular segment. Other embodiments of this aspect include corresponding systems, apparatus, and computer programs, configured to perform the actions of the methods, encoded on computer storage devices.

These and other embodiments can each optionally include one or more of the following features. Providing data that cause presentation of a report interface can further include the action of providing data that cause presentation of a video viewer in the report interface. Providing data that cause presentation of a portion of the video content item can include providing data that cause presentation of the portion of the video content item within the video viewer.

Methods can further include the actions of determining that user interaction with the video viewer interface caused presentation of a particular portion of the video content item within the video viewer, the particular portion of the video content item being presented during a particular segment of the total duration of the video content item; and in response to determining that the user interaction caused presentation of the particular portion of the video content item, providing data that cause presentation of the play-through rate for the particular segment.

Providing data that cause presentation of a report interface can include the action of providing data that cause presentation in the play-though graph of a performance indicator in which the number of presentations of the video content item that were not terminated prior to the end of the segment is presented. Providing data that cause presentation of a portion of the video content item from the particular segment can include the action of providing data that cause presentation in the performance indicator of an image representing a frame of the video content item that is presented during the segment. The image can be selected from a frame of the video content item that is presented during presentation of the particular segment of the video content item.

Providing data that cause presentation of a report interface that includes a play-through graph can include the action of providing data that cause presentation of a play-through graph that is indicative of the number of presentations of the video content item on a per-presentation-type basis. Providing data that cause presentation of a play-through graph that is indicative of the number of presentations of the video content item on a per-presentation-type basis can include providing data that cause presentation of a play-through graph in which a plurality of different curves are presented, wherein each different curve is indicative of a different type of presentation environment in which the video content item.

At least one of the curves can be indicative of a number of in-slate presentations of the video content item or a number of in-search presentations of the video content item. At least one of the curves can be indicative of a number of in-display presentations of the video content item or a number of in-stream presentations of the video content item.

Methods can further include the action of selecting a portion of the video content item, the portion of the video content item including a frame from the particular portion of the video content item. The play-through rate for at least two different segments can differ.

Particular embodiments of the subject matter described in this specification can be implemented so as to realize one or more of the following advantages. The performance of a video can be determined and/or analyzed on a per-segment basis, where the performance for each segment of the video can represent a number of the presentations of the video that were not terminated prior to the end of the segment. The performance of a video can be determined and/or analyzed per-presentation-type basis, where each of presentation type is based on a presentation environment in which the video was presented.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The performance of a video content item (e.g., a video advertisement) is tracked and reported based on a play-through rate of the video content item. A video content item is video content (e.g., a video file) that is presented in (or with) resources (e.g., web pages or video files). The play-through rate of a video content item is a number (e.g., an absolute number or a relative portion of a total number) of presentations of the video content item that were not terminated prior to presentation of a pre-specified portion of a total duration of the video content item.

In some implementations, the play-through rate of a video content item can be determined on a per-segment basis. For example, the total duration of a video content item can be divided into two or more segments and the performance of each segment can be determined based on a number of the presentations of the video content item that were not terminated prior to the end (or another pre-specified portion) of the segment. Presentation of the video content item can be terminated, for example, by the browser (or a frame or window in the browser) in which the video content item is being presented being closed, by a viewer interacting with a "skip" button that bypasses further presentation of the video content item, or presentation of the video content item otherwise being stopped. As used throughout this document, the term viewer refers to a user that requested presentation of a video content item.

The play-through rate of a video content item can be represented in a play-though graph, where a curve of the play-through graph can be indicative of the play-through rate over the duration of the video content item. For example, as described in detail below, each portion of the curve can correspond to a segment of the video content item and indicate the performance of that segment or a change in performance from one segment of the video content item to an adjacent segment of the video content item.

When a user interacts with a particular portion of the play-through graph, the performance of the corresponding segment of the video content item can be presented in a performance indicator, and a portion of the video content item from the corresponding section can also be presented. Thus, an advertiser can view the performance for a particular segment of a video content item and also view, in the same interface, a visual representation of a portion of that particular segment. If a particular video content item is presented in different presentation environments (e.g., different types of advertisement slots or with different types of resources), the play-though graph can include multiple curves that each represent the performance of the video content item when presented in a different presentation environment.

Figure 1:
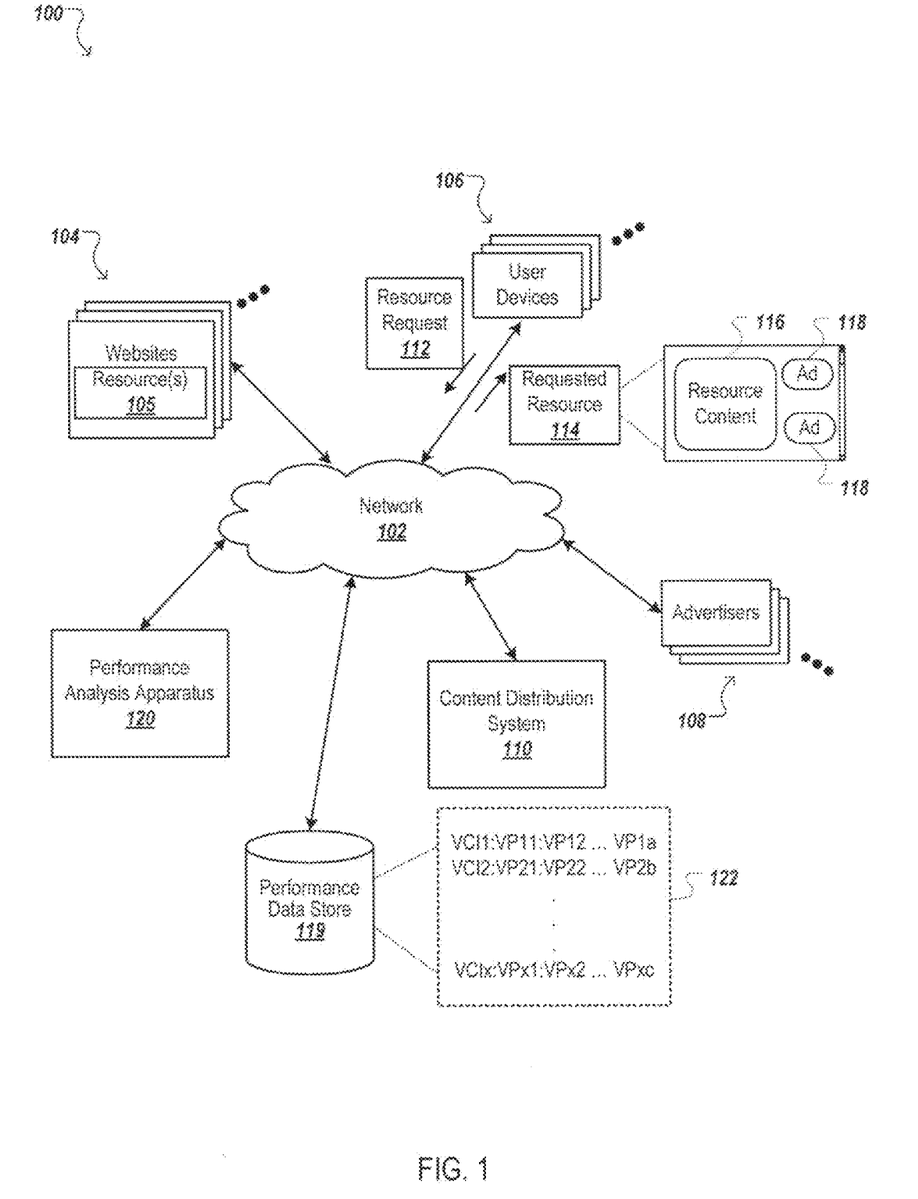
FIG. 1 is a block diagram of an example environment in which a content distribution system manages distribution of content items.

FIG. 1 is a block diagram of an example environment 100 in which a content distribution system 110 manages distribution of content items. The example environment 100 includes a network 102, such as a local area network (LAN), a wide area network (WAN), the Internet, or a combination thereof. The network 102 connects websites 104, user devices 106, advertisers 108, and the content distribution system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a search results page in which search results are presented, or another resource 105. The data representing the requested resource 114 can include data that cause presentation of resource content 116 at the user device. The data representing the requested resource 114 can also include data specifying a portion of the resource (e.g., a portion of a web page or a portion of another video, such as prior to the other video, following the other video, or after a pre-specified portion of the other video has been presented) or a portion of a user display (e.g., a presentation location of a pop-up window or in a slot of a web page) in which advertisements (or other video content items) can be presented. Throughout this document, these specified portions of the resource or user display are referred to as advertisement slots 118.

As noted above, advertisement slots 118 can be defined in a search results page. The search results page can be, for example, a general search results page that is presented in response to a general search query that is submitted to a general purpose search system (e.g., a search system that identifies resources of several different resource types). The search results page can also be, for example, a search results page that is presented in response to a search query that is submitted to a video content item search engine (e.g., a search system that identifies video content items that are responsive to the search query). Unless otherwise specified, the term "search results page" is intended to include both general search results pages as well as search results pages that present search results for pre-specified types of resources (e.g., video resources).

When a resource 105 is requested by a user device 106, the content distribution system 110 receives a request for advertisements to be provided with the requested resource 114. The request for advertisements can include characteristics of the advertisement slots that are defined for the requested resource 114, and can be provided to the content distribution system 110.

For example, a reference (e.g., URL) to the requested resource 114 for which the advertisement slot is defined, a size of the advertisement slot, and/or media types that are eligible for presentation in the advertisement slot can be provided to the content distribution system 110. Similarly, keywords associated with a requested resource ("resource keywords") can also be provided to the content distribution system 110 to facilitate identification of advertisements that are relevant to the requested resource 114.

Based on data included in the request for advertisements, the content distribution system 110 selects advertisements that are eligible to be provided in response to the request ("eligible advertisements"). For example, eligible advertisements can include advertisements having characteristics matching the characteristics of the advertisement slots 118 and that are identified as relevant to specified resource keywords. In some implementations, advertisements having targeting keywords that match the resource keywords are selected as eligible advertisements by content distribution system 110.

The eligible advertisements can include video advertisements. Video advertisements can include, for example, video content items that have been created exclusively for presentation in advertisement slots 118 or other video content items that have been identified, by an advertiser, as being available for presentation in advertisement slots 118 as well as being available in other viewing environments, such as online video sharing sites in which many different types of video content items may be presented (e.g., user provided videos).

Advertisers (as well as other owners or publishers of video content items) may be interested in evaluating the performance of their video content items. Therefore, the environment includes a performance analysis apparatus 120 that tracks presentations of video content items and provides advertisers information with which the advertisers can evaluate their video content items. The performance analysis apparatus 120 is depicted as being implemented independent of the content distribution system 110, but can also be implemented entirely, or in part, in the content distribution system 110.

In some implementations, the performance analysis apparatus 120 tracks presentations of video content items (VCIa-VCIx) and logs performance data 122 for the video content items in a performance data store 119. The performance data 122 for each presentation of a particular video content item includes data specifying a portion (e.g., VP11-VPxc) of the total duration of the video content item that was presented prior to presentation being terminated. For example, VP11-VP1a can each specify a total presentation time for a respective presentation of the video content item VCI1 and/or timestamp information specifying a particular point (e.g., 6 seconds after the beginning of the video content item) at which a viewer began watching the video and a particular point (e.g., 30 seconds after the beginning of the video) at which the viewer stopped presentation of the video. Similarly, if the viewer skipped portions of the video content item, there could be multiple paired timestamp entries that specified the start and stop times of particular portions of the video content item that were viewed by the user. Alternatively, or additionally, VP11-VP1a can each specify a percentage of the total duration of the video content item VC1 that was presented prior to termination of each respective presentation. The performance data for each video content item can be indexed according to (and/or stored with a reference to) the video content item with which the performance data is associated.

The performance analysis apparatus 120 can use the performance data 122 for each of the video content items to provide advertisers (or other video content owners or publishers) with information that facilitates evaluation of the performance of the video content items. In some implementations, the performance analysis apparatus 120 can use the performance data 122 for a particular video content item (e.g., VCI2) to determine a number of viewers that requested presentation (e.g., initiated play) of the video content item and/or a number of users that did not terminate presentation of the video content item (e.g., interact with a "stop" control or close a browser window in which the video content item was being presented) prior to presentation of the total duration of the video content item. For example, the performance analysis apparatus 120 can compare each portion (e.g., VP11-VP1a) of the video content item (e.g., VCI1) that was presented to the total duration of the video content item. In turn, the performance analysis apparatus 120 can determine a ratio of the number of portions that are equal to the total duration relative to the total number of portions and provide an advertiser with data indicative of this ratio, which can be referred to as a play-through rate for the video content item.

The play-through rate for a video content item is a measure (e.g., a relative measure, such as a percentage, or an absolute number) of the users that requested presentation of the video content item and did not terminate presentation of the video content item prior to presentation of a threshold portion of the video content item. In the example, above, the threshold portion is assumed to be 100% of the total duration, but other threshold durations can be specified. For example, assume that the threshold portion is specified as 50% of the total duration of the video content item and that 100 users requested presentation of the video content item and that 25 of these users allowed at least 50% of the total duration of the video content item to be presented. In this example, the play-through rate for the video content item could be 25% (e.g., 25/100).

The performance analysis apparatus 120 can also determine per-segment play-through rates for a video content item. A segment of a video content item is a subset (e.g., a proper subset) of the total duration of the video content item. The performance analysis apparatus 120 can determine the play-through rate for each particular segment based on the number of users that did not terminate presentation of the video content item prior to the end of that particular segment of the video content item.

For example, one play-through rate for a video content item may be determined based on a number of the users that did not terminate presentation of the video content item prior to the end of a first segment of the video content item (e.g., 25% of the total duration of the video content item), while a second play-through rate can be determined based on a number of the users that did not terminate presentation of the video content item prior to the end of a second segment of the video content item (e.g., 50% of the total duration of the video content item). Similarly, third and fourth play-through rates can be determined based on the number of presentations of the video content item that were not terminated prior to the end of the third segment (e.g., 75% of the total duration) and the fourth segment (e.g., 100% of the total duration), respectively.

In some implementations, each segment of the video content item is a disjoint subset of the total duration of the video content item. For example, a video content item having a total duration of 60 seconds can be segmented into quartiles (i.e., four different segments), where the first segment includes the first 15 seconds of the total duration (e.g., from time=0 seconds to time=15 seconds), the second segment includes the second 15 seconds of the total duration (e.g., from time=16 seconds to time=30 seconds), the third segment includes the third 15 seconds of the total duration (e.g., time=31 seconds to time=45 seconds), and the fourth segment includes the final 15 seconds of the total duration (e.g., time=46 seconds to time=60 seconds).

Quartiles are used for example purposes throughout this document, but a video content item can be segmented into any number of different segments. For example, the video content item in the example above may be segmented into 60 segments that are each 1 second long. Also, in some implementations, segments are not required to be disjoint subsets, such that two or more different subsets may be allowed to include overlapping portions of the total duration. For example, the second segment in the example above may be defined to also include the first segment, such that the second segment may include the first and second 15 seconds of the total duration (e.g., time=0 to time=30).

Each segment can also be specified in terms of the percentage of the total duration that has been presented at the end of the segment. For example, when a video content item is segmented into quartiles, the end of the first segment can be located at 25% of the total duration, while the ends of the second, third, and fourth segments can be respectively located at 50%, 75% and 100% of the total duration.

Once the performance analysis apparatus 120 has determined the per-segment play-through rates (and/or other performance measures), the performance analysis apparatus 120 provides the advertiser 108 (or another video content item owner or publisher) with data that cause presentation of a report interface that includes a play-through graph that is indicative of the play-through rate for each segment of the video content item. Also, as described in more detail below, in response to advertiser interaction with the play-through graph, the performance analysis apparatus 120 can provide the advertiser 108 with data that cause presentation in the report interface of a portion of the video content item.

In some implementations, performance measures can be determined within a particular segment. For example, if timestamps are used to specify start and stop times of particular portions of the video content item that were viewed by viewers, this information can be used to determine what portions (e.g., percentage) of each segment were viewed by the viewers. Similarly, this timestamp information could be used to determine a total portion of the video content item that was viewed by the viewers (e.g., independent of whether the viewers watched a complete segment).

Figure 2:
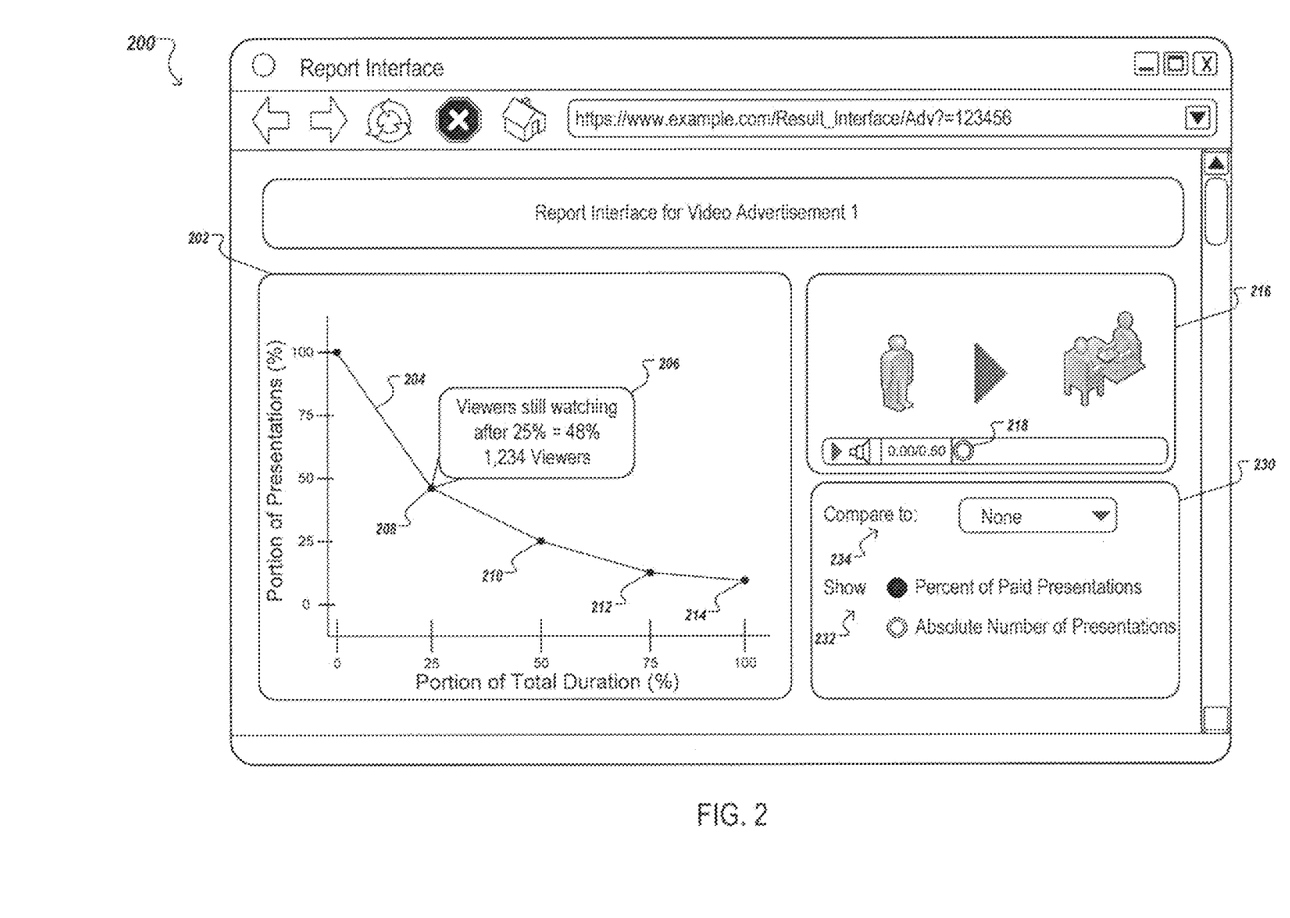
FIG. 2 is a screen shot of an example report interface.

FIG. 2 is a screen shot of an example report interface 200. The report interface 200 can be presented, for example, in a browser display of a user device. For example, using a web browser, an advertiser can access an online advertisement management tool that includes the report interface 200. The report interface 200 includes a play-though graph 202 including a curve 204 that is graphically indicative of play-through rates for different segments of a video advertisement.

The x-axis of the play-through graph 202 is labeled with values that are indicative of locations in the video advertisement at which different portions of the total duration of the video advertisement have been presented. For example, the x-axis of the play-through graph 202 is labeled with 0%, 25%, 50%, 75%, and 100%, which respectively represent the locations of the video advertisement at which 0%, 25%, 50%, 75%, and 100% of the total duration of the video advertisement has been presented.

The y-axis of the play-though graph 202 is labeled with values indicative of a portion of the number of the user devices that requested presentation of the video advertisement. For example, the y-axis of the play-though graph is labeled with 100%, 75%, 50%, 25%, and 0%, which respectively represent 100%, 75%, 50%, 25%, and 0% of the user devices that requested presentation of the video advertisement.

The curve 204 is indicative of the performance of the video advertisement over the total duration of the video advertisement. For example, the curve 204 is indicative of a number of the user devices at which the video advertisement was still being presented at various portions of the total duration of the video advertisement (i.e., a number of the presentations of the video advertisement that were not terminated prior to each of the various portions of the total duration). For example, according to the play-through graph 202, when presentation of the video advertisement reached 25% of the total duration, the video advertisement was still being presented at 48% of the user devices from which presentation of the video advertisement was requested. Thus, 48% of the presentations of the video advertisement had not been terminated prior to presentation of at least 25% of the total duration of the video advertisement, while 52% of the presentations of the video advertisement were terminated prior to presentation of 25% of the total duration of the video advertisement.

The performance of the video advertisement at each point along the curve 204 can be presented in a performance indicator 206. The performance indicator 206 is a user interface element in which a performance measure of a video advertisement is presented. The performance indicator 206 can be visually represented, for example, as a "callout box," as shown in FIG. 2 (other user interface elements can also be used to visually represent the performance indicator). In addition to presenting the portion of all presentations that had not been terminated prior to a particular point of the total duration, the performance indicator 206 can also include an absolute number of the presentations that had not been terminated prior to that point in the total duration. For example, as illustrated in FIG. 2, the performance indicator 206 includes information specifying that 1,234 viewers were still watching the video advertisement when 25% of the total duration of the advertisement was presented.

In some implementations, the performance indicator 206 is selectively presentable in response to user interaction with the curve 204 (or another portion of the play-through graph). For example, when the play-through graph 202 is initially presented, the performance indicator 206 may not be presented. However, upon detecting that user interaction with the curve 204 has occurred, the performance indicator 206 can be presented near the point on the curve with which the user interaction occurred. For example, if a user was determined to have interacted with the point 208, the performance indicator 206 can be presented at a location that is adjacent to the point 208 and/or in a manner that such that the performance indicator is visually in contact with the point 208.

The performance measure that is presented in the performance indicator can also be selected based on the point of the curve 204 with which a user was determined to have interacted. For example, if a user was determined to have interacted with the point 208, the performance measure that is presented in the performance indicator 206 can be the portion of the presentations of the video advertisement that were not terminated prior to presentation of 25% of the total duration of the video advertisement (e.g., based on the point 208 being located at the 25% value on the x-axis). If the user subsequently (or initially) interacts with another point on the curve 204, such as the point 210 which is located at the 50% value on the x-axis, the performance indicator 206 can then be displayed near the point 210, and the performance measure that is presented in the performance indicator can be based, for example, on the number of presentations of the video advertisement that were not terminated prior to presentation of at least 50% of the total duration of the video advertisement.

As described above, the total duration of a video advertisement (or other video content items) can be segmented into two or more different segments. When the total duration of a video advertisement is segmented, the performance measures for the video advertisement can be determined on a per-segment basis. For example, when the total duration of a video advertisement is segmented into quartiles (e.g., four equal and/or non-overlapping segments) a separate performance measure can be determined for each of the segments (e.g., based on the number of presentations that were not terminated prior to the end of the segment).

When the total duration is segmented into quartiles (or another delineation of the total duration) the graph can include a point that represents the end of each quartile (or other delineation) of the total duration. For example, as illustrated by FIG. 2, the points 208, 210, 212, and 214 respectively represent the end of the first, second, third, and fourth quartiles of the video advertisement, and the value of the y-axis at which the points 208, 210, 212, and 214 represent the number of the presentations that were not terminated prior to the end of the respective segments.

The points 208, 210, 212, and 214 also delineate different portions of the curve 204, with each portion of the curve representing a segment of the total duration of the video advertisement. The portion of the curve 204 that ends at point 208 is a first portion of the curve 204 that can represent the performance measure (or a performance measure change) for the video advertisement from the beginning of the video advertisement to the end of a first segment of the video advertisement. For example, the first portion of the curve 204 can be visually indicative of a number of the users that requested presentation of the video advertisement and then terminated presentation of the video advertisement prior to presentation of at least 25% of the video advertisement (i.e., the end of the first segment).

Similarly, the portions of the curve 204 from points 208 to 210, 210 to 212, and 212 to 214 respectively represent the performance measure (or a performance measure change) for the video advertisement from the end of the first segment to a second segment, from the end of the second segment to a third segment, and from the end of the third segment to the end of a fourth segment of the video advertisement.

In some implementations, presentations of the video advertisement that are determined to have not been terminated at the end of a particular segment are required to have been identified as having not been terminated prior to the end of a previous segment. For example, with reference to the play-though graph 202, when determining whether presentations of the video advertisement continued past 75% of the total duration (e.g., point 212), the determination can be conditioned on whether those same presentations were identified as continuing past (e.g., having not been terminated prior to) 50% of the total duration (e.g., point 210). Conditioning the determination in this manner can help ensure that accurate reporting is achieved by filtering data indicating that presentations proceeded past a particular segment when it has been determined that the presentations did not proceed past another segment (i.e., a segment that temporally precedes the particular segment).

In some implementations, the report interface 200 also includes a video viewer 216 in which a portion (the total duration or a proper subset) of the video advertisement can be presented. For example, the video viewer 216 can be implemented as an embedded application that can decode and/or present a video advertisement, one or more frames of the video advertisement, or an image representing one or more of the frames of the video advertisement.

The video viewer 216 can be presented at a location that is adjacent to (or within a specified number of pixels of) the play-through graph 202. Alternatively, the video viewer 216 can be presented in a separate window or frame relative to the window or frame in which the play-through graph 202 is presented. For example, the video viewer 216 may be presented in separate browser window that overlays the browser window in which the report interface is presented.

When the report interface 200 is initially presented at a user device (e.g., prior to user interaction with the graph 204), the video viewer 216 may present a pre-selected message (e.g., instructions on using the video player or a name of the video advertisement). Alternatively, the video viewer 216 may present a frame from the video advertisement, such as the first frame of the video advertisement, or a blank background (e.g., a black background).

The frame of the video advertisement that is presented in the video viewer 216 can be selected and/or updated in response to user interaction with the graph 204. For example, when user interaction with the point 208 occurs, as described above, the video viewer 216 can receive data indicating this interaction and request (e.g., from the performance analysis apparatus 120) a frame of the video advertisement that is presented when presentation of the video advertisement has reached 25% of the total duration. In response to the request, the video viewer 216 can receive (e.g., from the performance analysis apparatus 120) data that represent the requested frame. In turn, the video viewer 216 can use the received data to present the requested frame, such that a frame indicative of the content that was being presented at the end of a particular segment is presented in the report interface 200 with the performance measure for the end of that particular segment.

The video viewer 216 can also receive the entire video advertisement (either in response to user interaction with the graph 204 or upon initial loading of the report interface 200), and in response to determining that user interaction with the graph 204 occurred select for presentation, the frame of the video advertisement that corresponds to the point of the graph with which the user interaction occurred.

In some implementations, interaction with the video viewer 216 can cause changes to the performance measures that are presented in the performance indicator 206 and/or the location at which the performance indicator 206 is presented. For example, if the user interacts with a slider element 218 (or another video navigational tool) in a manner that causes a particular frame (e.g., a frame at the end of a particular segment or a frame that is within a temporal threshold of the end of the particular segment) to be presented, the performance indicator 206 can be presented at a point of the graph representing the end of a particular segment that is near (e.g., closest to) the frame that has been selected by the user. In turn, the performance measure (and/or other information) that is presented in the performance indicator 206 can be updated to represent the performance measure for the end of that particular segment.

In some implementations, the user interaction can initiate a request that the video advertisement be played (e.g., that two or more of the frames of the video advertisement be sequentially presented at a standard presentation rate) in the video viewer 216. As presentation of the video advertisement proceeds from one segment to another, the performance indicator can be automatically updated to be presented at a location of the curve 204 that corresponds to the segment of the video advertisement that is being presented. For example, as presentation of the video advertisement proceeds from 0% of the total duration to 100% of the total duration, the performance indicator 206 can move along the curve 204 (e.g., be presented at or near locations on the curve) from x=0% to x=100%. As the performance indicator 206 moves along the curve 204, the performance measure that is presented in the performance indicator 206 can be updated to reflect, for example, the value of the y-axis (e.g., a portion of the presentations that continued past the portion of the total duration that has been presented).

The report interface 200 can also include various other portions that provide information about the video advertisement. In some implementations, the report interface 200 includes a graph option portion 230 in which a user can select viewing options for the play-through graph 202. For example, the graph option portion 230 includes a "show" element 232 that enables a user to select whether the y-axis of the play-through graph 202 is labeled using a relative measure of presentations (e.g., a percentage of the total presentations) that continued through the respective sections of the video advertisement or whether the y-axis is labeled using absolute measures of presentations (e.g., a total number of the presentations) that continued through the respective sections of the video advertisement.

The graph option portion 230 also includes a "compare" element 234 that enables a user (e.g., an advertiser) to compare the performance of two or more different video advertisements on the same play-through graph 202. For example, an advertiser could use the compare element 234 to cause presentation in the play-through graph 202 of a curve that represents that performance of another one of the advertiser's video advertisements. This would enable the advertiser to perform a side by side comparison of the curves for the two advertisements. Note that neither the "show" element 232 nor the "compare" element 234 are required to be included in the report interface 200.

Figure 3:
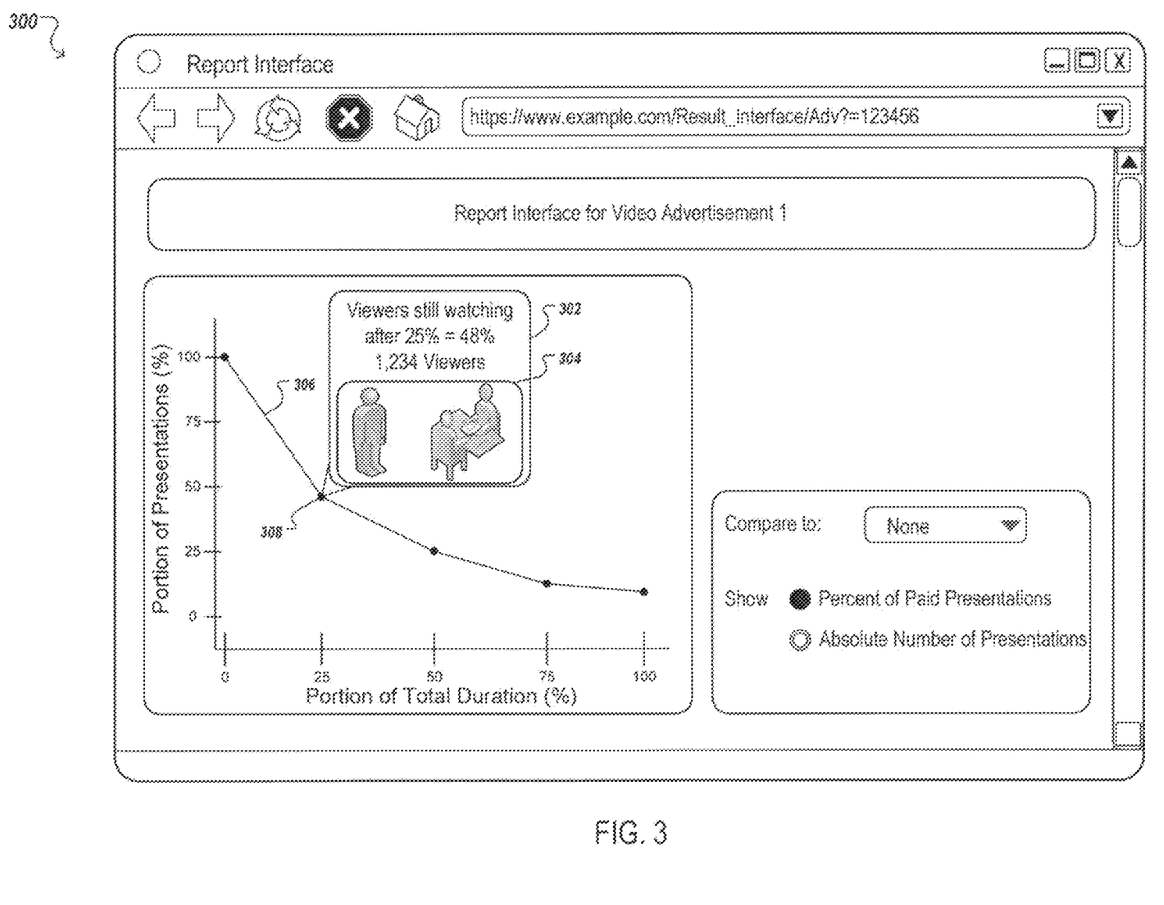
FIG. 3 is a screen shot of another example report interface.

FIG. 3 is a screen shot of another example report interface 300. The report interface 300 is similar to the report interface 200, but does not including the video viewer 216 described above. Instead, the report interface 300 includes a performance indicator 302 that includes an image portion 304 in which a representation of a frame (or the actual frame itself) of the video advertisement can be presented. The frame that is presented in the image portion 304 of the performance indicator can be selected in a manner similar to that described above. For example, when a user interacts with the curve 306 (e.g., clicking on or hovering a pointer over a point 308 on the curve), a frame that corresponds to the portion of the curve 306 with which the user interaction occurred can be requested and, upon receipt, presented in the image portion 304.

Figure 4:
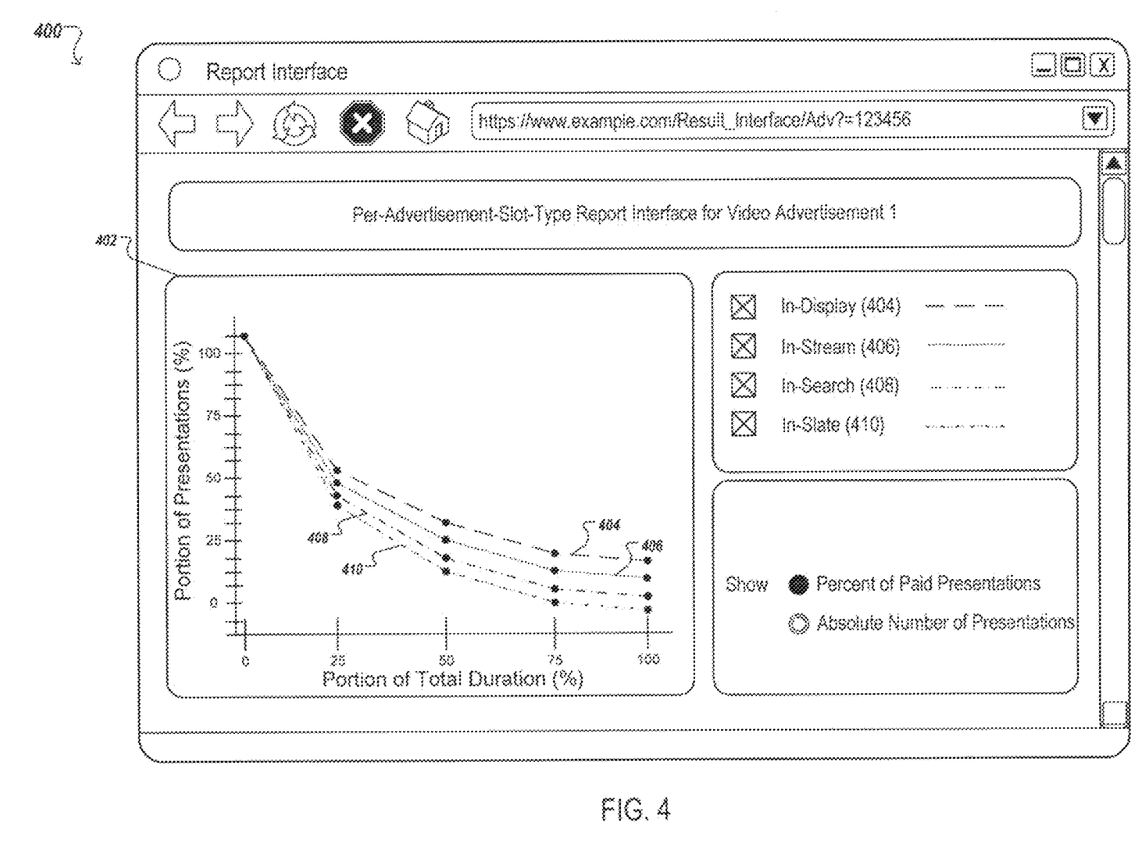
FIG. 4 is a screen shot of another example report interface.

FIG. 4 is a screen shot of another example report interface 400. The report interface 400 is similar to the report interfaces 200 and 300 that were described above, but the report interface 400 includes a play-though graph 402 that includes four different curves 404, 406, 408, and 410. Each of the curves 404-410 can represent the performance of a video advertisement when presented in a different type of advertisement slot.

Video advertisements can be identified as being eligible for presentation in many different types of advertising slots. For example, as noted above with reference to FIG. 1, a video advertisement may be eligible for presentation in an advertisement slot that is located in a side position (e.g., relative to search results) or a banner position (e.g., above the search results) of a search results page (or another web page), such that the video advertisements that are presented in the advertisement slot are not presented in the list of search results. Presentations of video advertisements in advertisement slots that are located in a separate portion (e.g., a sidebar or a banner position) of a search results web page relative to the presentation position of the search results are referred to as "in-display" presentations, and the performance of "in-display" presentations of the video advertisement can be represented by the curve 404 in the play-through graph 402.

Video advertisements can also be eligible for presentation in advertisement slots that have been defined within another video content item. For example, the publisher of a particular video content item may specify that one or more video advertisements may be shown prior to presentation of the particular video content item, following the particular video content item, or during a pre-specified portion of the particular video content item. Presentations of video advertisements in advertisements slots that are included in another video content item are referred to as "in-stream" presentations. The performance of "in-steam" presentations of the video advertisement can be represented by the curve 404.

Video advertisements can also be eligible for presentation within the search results that are provided in response to a search query. For example, the video advertisement may be identified as responsive (e.g., having at least a minimum specified measure of relevance) to a search query, and therefore, selected for presentation as a search result (e.g., presented with a colored or shaded background to identify the video advertisement as a sponsored search result). Presentations of video advertisements can be initiated directly from and/or within the list of search results, and are referred to as "in-search" presentations. The performance of "in-search" presentations of a video advertisement can be represented by the curve 406.

A video advertisement can further be eligible for presentation in response to viewer selection of the video advertisement from a set of video content items that are suggested to a viewer following presentation of a first video content item. For example, following presentation of the first video content item, a viewer in which the first video content item was presented can be populated with references to an additional video content item that are suggested for viewing. The additional video content item can be, for example, a video content items that has been identified as relevant to the first video content item (e.g., based on a number of viewers that viewed the first video content item and then continued to view the additional video content item), and the additional content item can be the video advertisement. Presentations of the video advertisement can be initiated through viewer interaction with the reference to the video advertisement (e.g., a thumbnail from the video advertisement or a title for the video advertisement) that was presented in the viewer, and are referred to as "in-slate" presentations. The performance of "in-slate" presentations can be represented by the curve 408.

As illustrated by FIG. 4, the curves for each of the different types of presentations of the video advertisement can be presented in the same play-through graph 402. Thus, the performance of the video advertisement can be analyzed on a per-presentation-type basis. For example, according to the play-through graph 402, the percentage of "in-display" presentations (e.g., 404) of the video advertisement have been presented for at least 50% of the total duration is higher than the percentage of "in-stream" (e.g., 406), "in-search" (e.g., 408), or "in-slate" presentations (e.g., 410).

Figure 5:
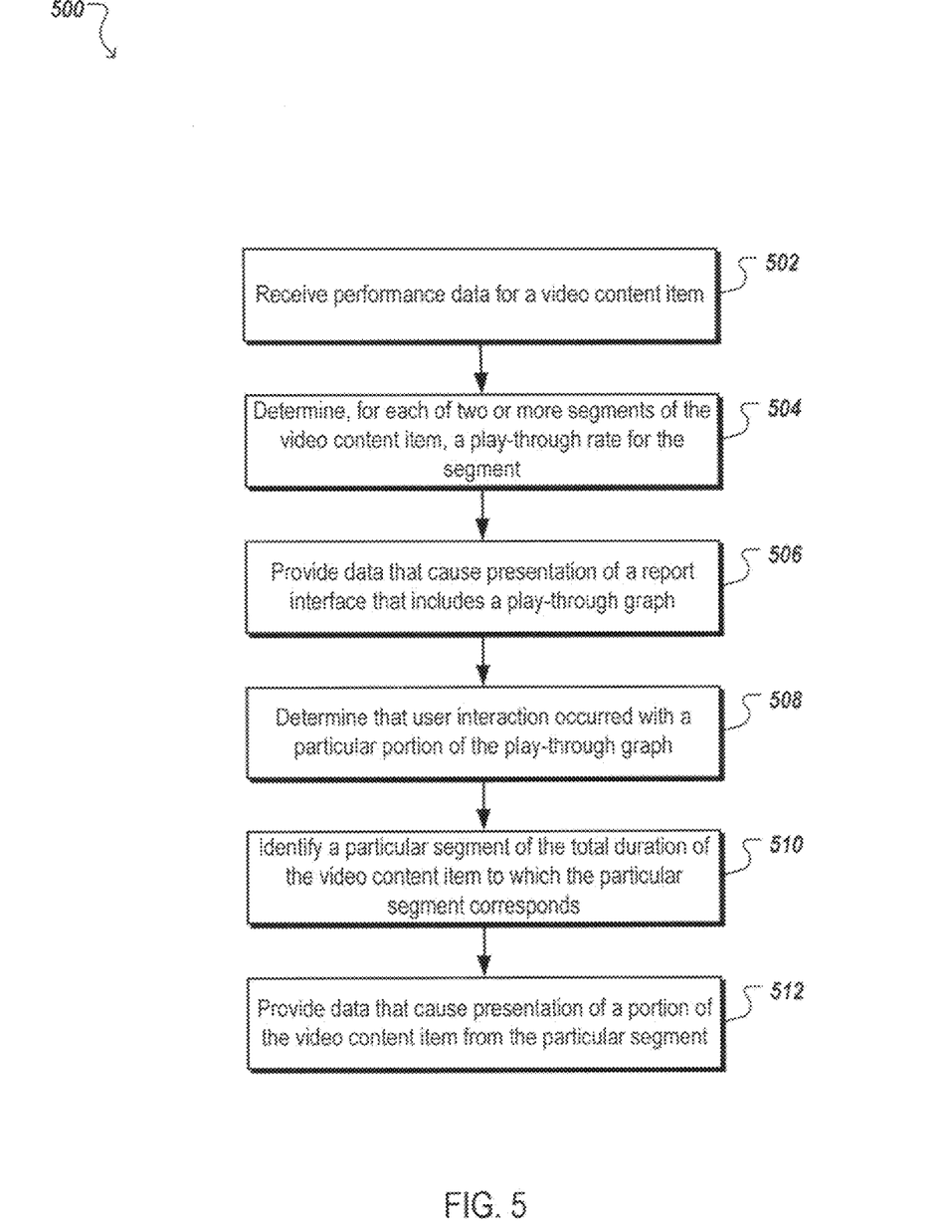
FIG. 5 is a flow chart of an example process for providing a report interface.

FIG. 5 is a flow chart of an example process 500 for providing a report interface. The process 500 is a process by which performance data that are indicative of a number of presentations of a video content item are used to determine a per-segment play-through rate for the video content item. In turn, data that cause presentation of a report interface are provided, for example, to a user device. The report interface can include a play-through graph that is indicative of the play-through rates for two or more different segments of the video content item. User interaction with a particular portion of the play-through graph is determined to have occurred, and a particular segment to which the particular portion of the graph corresponds is identified. In turn, data are provided that cause presentation of a portion (e.g., a frame or an image of the frame) of the video content item from the particular segment of the video content item.

In some implementations, the process 500 can be performed, for example, by the performance analysis apparatus 120 of FIG. 1 or another data processing apparatus. The process 500 can also be implemented as instructions stored on a non-transitory computer readable medium that upon execution cause a data processing apparatus to perform operations of the process 500.

Receive performance data indicative of a number of presentations of a video content item at user devices (502). As described above with reference to FIG. 1, the performance data for each presentation of a particular video content item includes data specifying a portion of the total duration of the video content item that was presented prior to presentation being terminated. For example, the performance data for each presentation can specify an absolute presentation time (e.g., 30 seconds) or a percentage of the total duration of the video content item that was presented prior to presentation being terminated. The performance data can be received, for example, from a data store (e.g., performance data store 119 of FIG. 1) that stores the performance data.

A play-through rate is determined for each of two or more segments of the total duration of the video content item (504). As described above, each segment is a subset of the total duration. In some implementations, the play through rate for each segment is based on a number of the presentations of the video content item that were not terminated prior to an end of the segment. For example, as illustrated by FIG. 2, the play-through rate for the first segment of the video content item is 48%, which indicates that 48% of the presentations of the video content item were not terminated prior to at least 25% of the total duration of the video content item was presented. The play-through rate for a particular segment can be computed, for example, as a ratio of the number of presentations that were not terminated prior to the end of the segment relative to a total number of presentations of the video content item.

Data that cause presentation of a report interface that includes a play-through graph are provided (506). In some implementations, the data can be provided in response to a request for the data that is received from a user device that is under control of an advertiser (or another video content owner or publisher), and the data can be provided to the requesting user device. For example, an advertiser can access an on-line advertisement management account (or video management account) and submit a request for presentation of a report interface similar to that illustrated in FIG. 2. The request can be received by a data processing apparatus (e.g., the performance analysis apparatus of FIG. 1), and in response to the request, the data processing apparatus can provide the data that cause presentation of the report interface.

The play-through graph can have two or more graph portions, where each graph portion is indicative of the play-through rate for a different segment of the video content item. Thus, the play-through rate for at least two different segments can differ, for example, when at least one of the presentations of the video content item is terminated prior to the end of the later presented segment. For example, as described above with reference to FIG. 2, the curve 204 includes several different portions that each correspond to a respective segment of the video content item In some implementations, the data that are provided can include data that cause presentation of a video viewer in the report interface. In some implementations, the video viewer is implemented as a set of instructions that when executed by a browser application, cause presentation of the video viewer within the report interface. For example, as illustrated by FIG. 2, the video viewer can be presented within the page that is rendered at the user device. In some implementations, upon execution by the browser, the instructions cause the video viewer to be presented in a different frame or browser window than the report interface.

In some implementations, the data that are provided can include data that cause presentation in the play-though graph of a performance indicator in which the number of presentations of the video content item that were not terminated prior to the end of the segment is presented. For example, as illustrated by FIG. 2, the play-through graph 202 includes a performance indicator 206 in which the performance for a particular segment of a video advertisement is presented. As illustrated by FIG. 3, the performance indicator (e.g., 302) can also be implemented to present a portion of the video content item. For example, a frame of the video content item or a visual representation of the frame (e.g., as stored in an image file) can be presented in the performance indicator.

As discussed above with reference to FIG. 4, a play-through graph can include multiple different curves, where each curve is indicative of the performance of a video content item (e.g., video advertisement) when presented in different presentation environments. Thus, the data that are provided can include data that cause presentation of a play-through graph that is indicative of the number of presentations of the video content item on a per-presentation-type basis.

For example, the data that cause presentation of a play-through graph in which a plurality of different curves are presented, wherein each different curve is indicative of a different type of presentation environment in which the video content item. At least one of the curves can be indicative of a number of in-slate presentations of the video content item, while another curve can be indicative of a number of in-search presentations of the video content item. A third curve can be indicative of a number of in-display presentations of the video content item, and a fourth curve can be indicative of a number of in-stream presentations of the video content item. Thus, the performance of a video content item can be analyzed on a per-presentation-type basis.

A determination is made that user interaction occurred with a particular portion of the play-through graph (508). In some implementations, the determination can be made by detecting a request for a portion of the video content item. For example, when a user interacts with a particular portion of the curve that is presented in the play-through graph, the interaction can cause a request for a portion of the video content item to be submitted to a data processing apparatus (e.g., performance analysis apparatus 120).

The request can include, for example, data indicating the particular portion of the curve with which the user interacted. For example, if the user clicked on (hovered a pointer over or otherwise interacted with) the point 210, the request that is received by the data processing apparatus can include data specifying that the user interacted with the point 210, which corresponds to the end of the second segment of the video content item (e.g., 50% of the total duration). In turn, the data processing apparatus can use the data in the request to determine that the user interacted with the point 210.

A particular segment of the total duration that corresponds to the particular portion of the play-through graph is identified (510). In some implementations, the particular segment is the segment for which the particular portion of the play-though graph is indicative of the play-though rate. Continuing with the example above, if user interaction with the point 210 of the curve 204 has been determined to have occurred, the data processing apparatus can then determine that the point 210 is indicative of the play-through rate of the video content item at the end of the second segment (e.g., 50% of the total duration), for example, because the point 210 is located at the end of the second portion of the curve 204 (e.g., at the 50% value on the x-axis of the play-through graph). Thus, in this example, the particular segment of the video content item to which the particular portion of the play-through graph corresponds is the second segment of the video content item.

In some implementations, a portion of the video content item from the particular segment can be selected for presentation in response to the determination that a user interacted with the play-through graph. For example, a frame of the video content item from the particular segment that corresponds to the portion of the play-through graph with which the user interaction occurred can be selected for presentation. In some implementations, the frame that is selected can be the first frame of the particular segment, the last frame in the segment, or a frame from a pre-specified location in the segment (e.g., 50% of the duration of the segment or within a threshold).

Data that cause presentation of a portion of the video content item from the particular segment are provided (512). In some implementations, the data that are provided cause the portion of the video content item to be presented within a video viewer. For example, as illustrated in FIG. 2, a frame of the video content item can be presented in a video viewer. While the description above refers to selection and presentation of a frame of the video content item a larger portion of the video content item can be selected and provided to the user device in response to user interaction with the play-through graph. For example, in response to user interaction with a particular portion of the play-through graph, the entire (or a proper subset of) the particular segment to which the particular portion corresponds can be selected and provided to the user device. If the portion of the video content item is being presented in a video viewer, interaction with the video viewer can cause playback (i.e., presentation) of the portion of the video content item.

In some implementations, the data that are provided cause the portion of the video content item (or an imaging representing the portion) to be presented in a performance indicator in which the play-through rate is also presented. For example, as illustrated in FIG. 3, the performance indicator 302 can include the play-through rate for a particular segment of the video content item as well as an image from the segment (e.g., a first or last frame of the segment).

Figure 6:
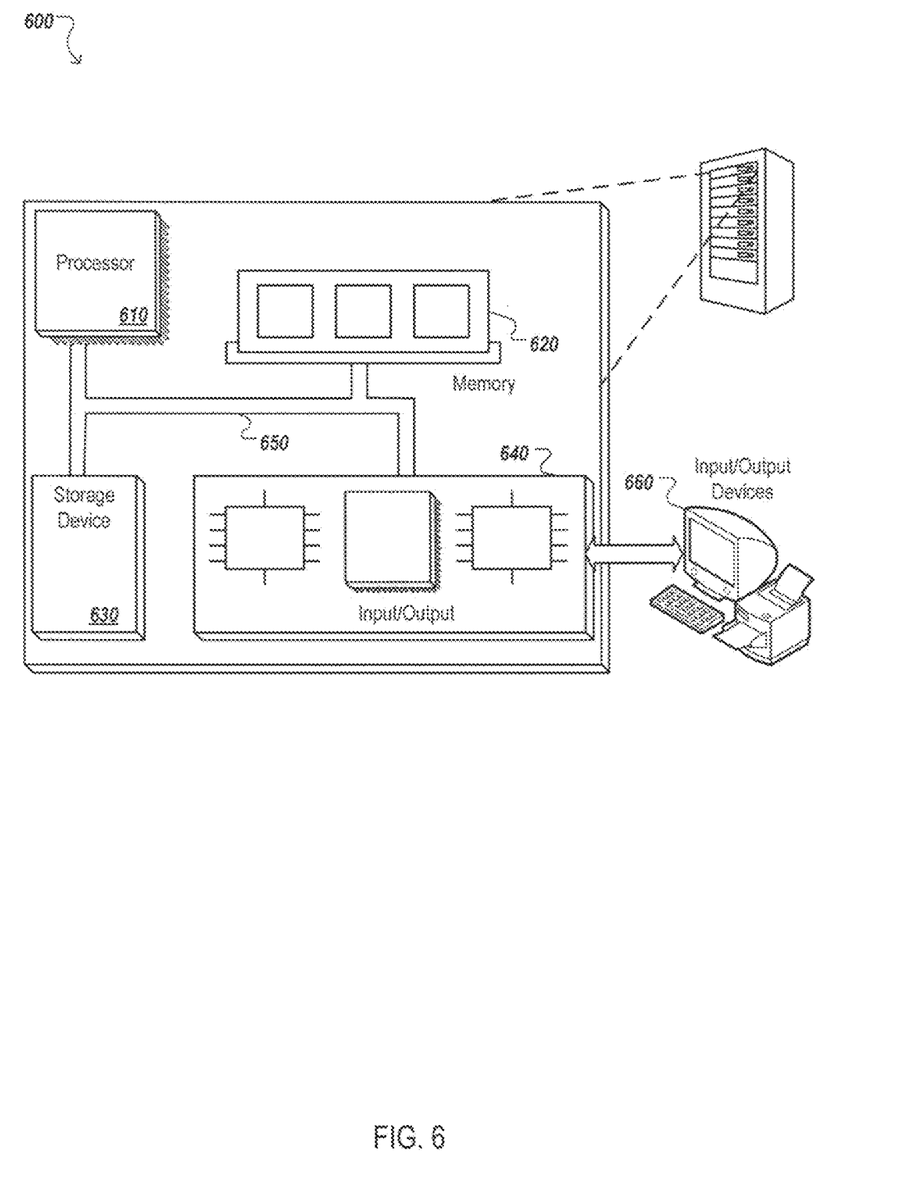
FIG. 6 is block diagram of an example computer system.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving, by a processor, performance data indicative of presentations of a video content item in different presentation environments, the performance data for a presentation of the video content item in each of the different presentation environments also specifying a segment of a total duration of the video content item that was presented prior to the presentation being terminated;
determining, by the processor, for each of two or more segments of the total duration, respective play-through rates for the segments in the different presentation environments, wherein a play-through rate for a segment indicates, for each of the different presentation environments, a number of presentations of the video content item that were initiated at a beginning of the video content item and were not terminated prior to an end of the segment, each segment being a different subset of the total duration; and
displaying, by the processor, a report interface that includes an interactive play-through graph, the interactive play-through graph having selectable curves indicating the respective play-through rates for the segments in the different presentation environments, each curve having portions that each correspond to a different segment of the total duration of the video content item in a corresponding presentation environment of the different presentation environments, wherein the curves are presented simultaneously to provide a visual comparison of different play-through rates for a portion of the video content item from a respective segment of the total duration in the different presentation environments, and wherein user interaction with a portion of any of the curves causes display of a user interface element visually representing a portion of the video content item from a respective segment of the total duration in the corresponding presentation environment of the different presentation environments.

2. The method of claim 1, further comprising:
modifying the report interface to include a playback of the portion of the video content item from the respective segment.

3. The method of claim 2, wherein:
user interaction with the portion of the video content item in one of the curves causes a user interface element to be displayed within the interactive play-through graph,
the user interface element comprises a performance indicator in which the number of presentations of the video content item that were not terminated prior to the end of the respective segment is presented, and
the performance indicator comprises an image representing a frame of the video content item from the respective segment.

4. The method of claim 1, further comprising, in response to receiving input indicating selection of a compare element in the play-through graph, generating, in the play-through graph, a play-through rate comparison of the video content item with another video content item.

5. The method of claim 1, wherein at least two segments overlap.

6. The method of claim 1, wherein the report interface further comprises a video viewer.

7. The method of claim 6, further comprising presenting the portion of the video content item within the video viewer.

8. The method of claim 6, further comprising:
determining that user interaction with the video viewer caused presentation of a particular portion of the video content item within the video viewer, the particular portion of the video content item being presented during a particular segment of the total duration of the video content item; and in response to determining that the user interaction caused presentation of the particular portion of the video content item, presenting, in the report interface, a determined play-through rate for the particular segment.

9. The method of claim 1, wherein one of the different presentation environments is an in-slate presentation.

10. The method of claim 1, wherein one of the different presentation environments is an in-search presentation.

11. The method of claim 1, wherein one of the different presentation environments is an in-stream presentation.

12. The method of claim 1, wherein one of the different presentation environments is an in-display presentation.

13. A non-transitory computer storage medium having instructions that, when executed by a processor, cause the processor to perform operations comprising:

receiving performance data indicative of presentations of a video content item in different presentation environments, the performance data for a presentation of the video content item in each of the different presentation environments also specifying a segment of a total duration of the video content item that was presented prior to the presentation being terminated;

determining, for each of two or more segments of the total duration, respective play-through rates for the segments in the different presentation environments, wherein a play-through rate for a segment indicates, for each of the different presentation environments, a number of presentations of the video content item that were initiated at a beginning of the video content item and were not terminated prior to an end of the segment, each segment being a different subset of the total duration; and displaying a report interface that includes an interactive play-through graph, the interactive play-through graph having selectable curves indicating the respective play-through rates for the segments in the different presentation environments, each curve having portions that each correspond to a different segment of the total duration of the video content item in a corresponding presentation environment of the different presentation environments, wherein the curves are presented simultaneously to provide a visual comparison of different play-through rates for a portion of the video content item from a respective segment of the total duration in the different presentation environments, and wherein user interaction with a portion of any of the curves causes display of a user interface element visually representing a portion of the video content item from a respective segment of the total duration in the corresponding presentation environment of the different presentation environments.

14. The non-transitory computer storage medium of claim 13, the operations further comprising:

modifying the report interface to include a playback of the portion of the video content item from the respective segment.

15. The non-transitory computer storage medium of claim 14, wherein:

user interaction with the portion of the video content item in one of the curves causes a user interface element to be displayed within the interactive play-through graph, the user interface element comprises a performance indicator in which the number of presentations of the video content item that were not terminated prior to the end of the respective segment is presented, and the performance indicator comprises an image representing a frame of the video content item from the respective segment.

16. The non-transitory computer storage medium of claim 13, the operations further comprising, generating, in response to receiving input indicating selection of a compare element in the play-through graph, a play-through rate comparison of the video content item with another video content item in the play-through graph.

17. The non-transitory computer storage medium of claim 1, wherein at least two segments overlap.

18. The non-transitory computer storage medium of claim 13, wherein the report interface further comprises a video viewer.

19. The non-transitory computer storage medium of claim 18, the operations further comprising presenting the portion of the video content item within the video viewer.

20. The non-transitory computer storage medium of claim 18, the operations further comprising:

determining that user interaction with the video viewer caused presentation of a particular portion of the video content item within the video viewer, the particular portion of the video content item being presented during a particular segment of the total duration of the video content item; and presenting, in response to the determination that the user interaction caused presentation of the particular portion of the video content item, a determined play-through rate for the particular segment in the report interface.

21. The non-transitory computer storage medium of claim 13, wherein one of the different presentation environments is an in-slate presentation.

22. The non-transitory computer storage medium of claim 13, wherein one of the different presentation environments is an in-search presentation.

23. The non-transitory computer storage medium of claim 13, wherein one of the different presentation environments is an in-stream presentation.

24. The non-transitory computer storage medium of claim 13, wherein one of the different presentation environments is an in-display presentation.

25. A system comprising:

a processor; and a memory communicatively coupled to the processor, the memory having stored therein computer-executable instructions, comprising:

a performance analysis component to:

obtain performance data indicative of presentations of a video content item in different presentation environments, the performance data for a presentation of the video content item in each of the different presentation environments also specifying a segment of a total duration of the video content item that was presented prior to the presentation being terminated;

determine, for each of two or more segments of the total duration, respective play-through rates for the segments in the different presentation environments, wherein a play-through rate for a segment indicates, for each of the different presentation environments, a number of presentations of the video content item that were initiated at a beginning of the video content item and were not terminated prior to an end of the segment, each segment being a different subset of the total duration; and generate a report interface that includes an interactive play-through graph, the interactive play-through graph having selectable curves indicating the respective play-through rates for the segments in the different presentation environments, each curve having portions that each correspond to a different segment of the total duration of the video content item in a corresponding presentation environment of the different presentation environments, wherein the curves are presented simultaneously to provide a visual comparison of different play-through rates for a portion of the video content item from a respective segment of the total duration in the different presentation environments, and wherein user interaction with a portion of any of the curves causes display of a user interface element visually representing a portion of the video content item from a respective segment of the total duration in the corresponding presentation environment of the different presentation environments.

26. The system of claim 25, wherein the performance analysis component is further to:
modify the report interface to include a playback of the portion of the video content item from the respective segment.

27. The system of claim 26, wherein:
user interaction with the portion of the video content item in one of the curves causes a user interface element to be displayed within the interactive play-through graph, the user interface element comprises a performance indicator in which the number of presentations of the video content item that were not terminated prior to the end of the respective segment is presented, and the performance indicator comprises an image representing a frame of the video content item from the respective segment.

28. The system of claim 25, wherein the performance analysis component is further to, in response to receiving input indicating selection of a compare element in the play-through graph, generate in the play-through graph a play-through rate comparison of the video content item with another video content item.

29. The system of claim 25, wherein at least two segments overlap.

30. The system of claim 25, wherein the report interface further comprises a video viewer.

31. The system of claim 30, wherein the performance analysis component is further to present the portion of the video content item within the video viewer.

32. The system of claim 31, wherein the performance analysis component is further to:
determine that user interaction with the video viewer caused presentation of a particular portion of the video content item within the video viewer, the particular portion of the video content item being presented during a particular segment of the total duration of the video content item; and
in response to a determination that the user interaction caused presentation of the particular portion of the video content item, present in the report interface a determined play-through rate for the particular segment.

33. The system of claim 25, wherein one of the different presentation environments is an in-slate presentation.

34. The system of claim 25, wherein one of the different presentation environments is an in-search presentation.

35. The system of claim 25, wherein one of the different presentation environments is an in-stream presentation.

36. The system of claim 25, wherein one of the different presentation environments is an in-display presentation.

* * * * *